(12) United States Patent
Youngren

(10) Patent No.: US 8,200,627 B2
(45) Date of Patent: Jun. 12, 2012

(54) JOURNALING DATABASE CHANGES USING A BIT MAP FOR ZONES DEFINED IN EACH PAGE

(75) Inventor: Larry William Youngren, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 12/261,097

(22) Filed: Oct. 30, 2008

(65) Prior Publication Data

US 2010/0115000 A1    May 6, 2010

(51) Int. Cl.
*G06F 17/30* (2006.01)
(52) U.S. Cl. .................... 707/624; 707/625
(58) Field of Classification Search ........... 707/999.202, 707/624, 625, 674
See application file for complete search history.

(56) References Cited

U.S. PATENT DOCUMENTS

| | | | |
|---|---|---|---|
| 4,819,156 A | 4/1989 | DeLorme et al. | |
| 5,574,897 A | 11/1996 | Hermsmeier et al. | |
| 6,298,345 B1 * | 10/2001 | Armstrong et al. | 1/1 |
| 7,657,584 B2 * | 2/2010 | Kawamura et al. | 707/610 |

* cited by examiner

*Primary Examiner* — Monica Pyo
(74) *Attorney, Agent, or Firm* — Martin & Associates LLC; Bret J. Peterson

(57) ABSTRACT

The disclosure and claims herein are directed to efficient journaling for recovery of a database index by journaling zones of a page. A journal mechanism maintains a page zone bit map that includes a bit for a plurality of zones in each page to indicate which zones have had their unchanged image journaled before being changed since a last sync point update. The page zone bit map has a bit for each zone in each page so that the status of each zone can be tracked separately. Tracking the smaller zones of the pages makes the process more efficient both at run time and during recovery by reducing the period of time for memory deposits and reducing the amount of total redundant/recovery data sent to disk for larger pages.

6 Claims, 5 Drawing Sheets

JOURNALING DATABASE CHANGES USING A BIT MAP FOR ZONES DEFINED IN EACH PAGE

BACKGROUND

1. Technical Field

This disclosure generally relates to system recovery in a computer database system, and more specifically relates to journaling database changes using a bit map for zones defined in each page of large page indexes in a structured query language index.

2. Background Art

Computer databases typically contain data space entries, or records, plus indexes that provide ordered lists of the data space entries based on key values contained in the data space entries. When changes are made to the entries in a data space (s), the corresponding database indexes over the data space may need to be updated in order to keep the indexes synchronized with respect to the data space they cover. Often the changes to the database index(es) are made first, followed by the changes to the data space. This order of changes is chosen to allow any conditions that would prevent the updating of the database indexes to surface before a data space is changed. The attempt to insert a duplicate key into a unique index is one such condition. When the system terminates abnormally, the data spaces and the database indexes relating thereto may not be synchronized. Some transactions may have caused database index(es) to be updated, but the associated data space entries may not have been updated at the time the system terminated.

Journaling of transactions which cause a change in a database is a well known technique, and is described in detail in the following references: U.S. Pat. No. 4,819,156 to DeLorme et al., and U.S. Pat. No. 5,574,897 to Hermsmeier et al. These prior art approaches were developed when the size of the logical pages being logged as virgin images within indexes was rather modest. Current operating systems (such as i5/OS by International Business Machines Corporation (IBM)) provide customized logical page sizes for indexes that can vary from 4 k up to 512K bytes. Larger logical page sizes often improve query performance because they increase the locality of reference, reduce the number of off-page traversals, and reduce the total number of disk-to-memory transfers required in order to satisfy the query operation. However, this query improvement comes at a price and that price often affects run-time index maintenance overhead as well as an increase in high availability recovery time. Each time a key is added or removed from an index the surrounding software query language (SQL) index is placed at risk from loss and this at-risk condition is mitigated by logging/journaling the so-called virgin/before image of the entire logical leaf page (see the patents cited above). The larger the leaves of the index, the more overhead, the larger the main memory footprint, the more churn and the greater the disk traffic associated with such index logging. This puts system administrators with a dilemma to select between better query performance or increased index maintenance for high availability recovery.

The prior art algorithms for journaling indexes break down when large logical leaf page sizes are employed and the resulting performance suffers. Disk write traffic soars and gate contention duration rises as increasingly larger quantities of bytes are being managed. A trimmer approach is needed which doesn't flood the disk with so many bytes on behalf of the before/virgin images of SQL indexes.

Without a way to more efficiently journal the affected areas of these larger page sizes by using a smaller footprint, system administrators will continue to be forced to choose between better query performance and fast recovery from failures in a computer database.

BRIEF SUMMARY

The disclosure and claims herein are directed to efficient journaling for recovery of a database by journaling zones of a page. As described herein, a journal mechanism maintains a page zone bit map that includes a bit for a plurality of zones in each page to indicate which zones have had their unchanged image journaled before being changed since a last sync point update. The page zone bit map has a bit for each zone on a page so that the status of each zone can be tracked separately. Tracking the smaller zones of the pages makes the process more efficient both at run time and during recovery by reducing the period of time other operations are held at bay by locks and gates for memory deposits and reducing the amount of total data sent to disk for larger pages.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

1.0 Overview

Figure 1:
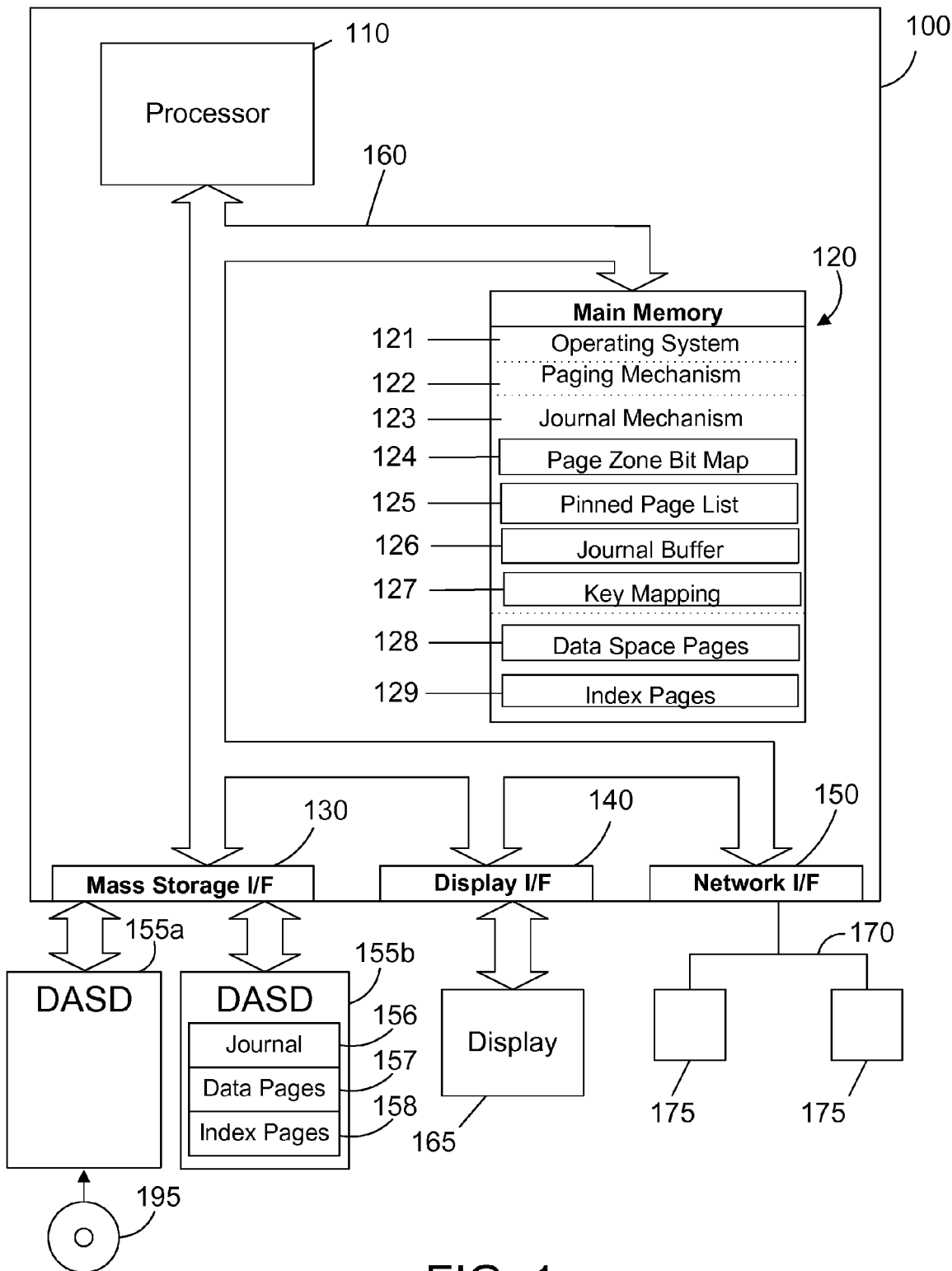
FIG. 1 is a block diagram of an apparatus with a journal mechanism for efficient journaling of a database index.

The present invention relates to efficient journaling for recovery of a database by journaling zones of a leaf page for a database index. For those not familiar with the concepts of journaling of database indexes, this Overview section will provide background information that will help to understand the present invention.

Databases may be comprised of data spaces that contain data space entries, or records, and database indexes that provide ordered lists of data space entries, based on key values contained in the data space entries. When changes are made to the entries in a data space(s), database indexes over the data space may need to be updated, in order to keep the indexes synchronized with respect to the data space they cover. In the IBM iSeries, the changes to the database index(es) are made first, followed by the changes to the data space. This order of changes is chosen to allow any conditions that would prevent the updating of the database indexes to surface before a data space is changed. The attempt to insert a duplicate key into a unique index is one such condition.

When the system terminates abnormally, the data spaces and the database indexes relating thereto may not be synchronized. Some transactions may have caused database index(es) to be updated, but the associated data space entries may not have been updated at the time the system terminated. To further complicate matters, in a virtual storage environment with paging, the paging routine may not have written the changed pages for either the data space or the associated database index(es) to nonvolatile storage, or it may have only written some of the changed pages for either the data space or the database index(es) to nonvolatile storage at the time of a failure. If some, but not all, of the changed pages for a database index were written to nonvolatile storage before an abnormal termination, the logical structure of the index that is available from nonvolatile storage after termination may be sufficiently inconsistent so as to preclude use of the index, even as a starting point for forward recovery (using a journal of data space entry changes).

Journaling transactions to a database works well for recovery of the data space, because it is only necessary to journal the image of each data space entry before and after each change. Each data space entry is localized at a fixed position within the data space, so few pages are changed when a data space entry is updated.

Journaling the changes to the database indexes relating to a data space is more complex because, depending on the type of data structure used for the index, a change to a single entry in an index may require changes to many logical pages in the index. Many popular index structures, such as binary radix trees and B-trees, exhibit the characteristic that a change to a single entry can require changes distributed through many logical pages of the index. An approach of journaling all changes to a database index may require so many pages to be journaled for each change of a data space entry that the technique cannot be used because of the very large storage requirements for the journal or because the performance cost of the required journal activity may be prohibitive.

Database indexes typically comprise binary radix tree indexes defined over data spaces. Journaling of unchanged index pages is also beneficial with other implementations of database indexes, such as B-Trees. A write-ahead journal is used to reflect all changes to a data space before the data space entries are actually changed. Changed index pages are not allowed to be written to auxiliary storage until their corresponding unchanged page images have been written to a journal on auxiliary storage. Thus, the journal on auxiliary storage always contains information that corresponds to the most recent changes to the journaled database indexes and data spaces, even before the indexes and data spaces are changed on auxiliary storage.

Unchanged database index pages are copied to a buffer in main storage before they are written to the journal on auxiliary storage. The buffer in main storage is not forced to be written to auxiliary storage until the before/virgin images of all database index pages to be changed and the changed and unchanged data space entry changes are added to the buffer. Allowing the journal information to accumulate in a main storage buffer reduces the number of I/O operations necessary to write the information to auxiliary storage, which can improve performance. Because this procedure allows the database index pages to be changed in main storage before the unchanged/virgin index pages are written to the journal on auxiliary storage, it is necessary to provide a mechanism to make sure that the write operation(s) for the journal are completed before the write operation(s) for the database index(es) are initiated.

The database indexes, data spaces, and journal reside on pages in a virtual storage environment. When a page from virtual storage is pinned in mainstore, the storage management mechanism of the system is not allowed to write the page to auxiliary storage or to re-assign the mainstore page frame to a different virtual page. The write operations to auxiliary storage are ordered by pinning any pages in a database index from just before the page is changed for the first time (in main storage) until after the unchanged page image is written to the journal on auxiliary storage. Other mechanisms are possible to ensure that the journal is updated before the database index on auxiliary storage, and such mechanisms are considered to be within the scope of the disclosure and claims herein.

A journal sync point is a marker, or pointer, which is associated with a particular journaled database index or data space, and which identifies the oldest entry in the journal that is needed to recover the associated journaled object after an abnormal termination. Each journaled database index and data space has its own sync point. The sync point can be viewed as the position in the journal that corresponds to the last (most recent) time when the state of the journaled database index or data space on auxiliary storage was known to be at a completely reliable and consistent state. The sync point for a journaled object is updated to reference a different journal entry whenever all pending changes for the object (database index or data space) are forced to be written from main storage to auxiliary storage.

The recovery of a journaled database index after an abnormal termination relies on the ability to return the index to some completely consistent state, and then re-processes changes to bring the index up to date with respect to the data spaces it covers. Since the journal sync point for a database index identifies a point where the index is in a consistent state, the recovery process needs to restore the state of the index at the time when the associated journal sync point was last updated. In order to return the index to its state at the last sync point, the journal must contain at least the unchanged/virgin images of every database index page that was changed in response to a change in one of the data spaces the index covers. By capturing the so-called "before" image of such index pages, this state can be reconstructed.

Preferably only the images of unchanged database index pages are saved in the journal. Once the image of an unchanged page in a database index has been added to the journal, no additional journal entries are required for that page until after the next sync point update, regardless of how many times an individual page is updated. Thus, if multiple changes occur between sync point updates to the same pages of the database index, there is no need to gather and save the contents of index pages that may contain complex and redundant changes. This initial capture is known as the virgin image of the index page. By capturing only the virgin image (not subsequent images) of the page, substantial space saving ensue. Other techniques are possible, such as saving the image of every database index page before every change. The preferred embodiment reduces the number of auxiliary storage I/O operations and the amount of auxiliary storage required, if multiple changes are made between sync point updates to the same database index page(s). If the images residing with the journal are transported to a second server so as to provide redundancy to help assure protection against outages, the communication traffic is reduced as well.

A mechanism is required to record which index pages remain unchanged since the last sync point, and which pages have had their unchanged images journaled before they were changed. Typically, a bit map is associated with the database index to determine which pages have been journaled and changed since the last sync point update. In the prior art, each bit in the map represents a single logical page in the index, and there is a separate bit map for each journaled database index. All the bits in the map for a journaled index are cleared (set to zero) when the index sync point is updated. The unchanged image of a database index page that has not been changed since the last sync point update is called a "virgin" page image. Before a page in the index is changed, the corresponding bit is tested to determine whether the page is still a virgin page. If the bit is reset (zero), the virgin image of the page is added to the journal, the bit is set (to one), the page is pinned in mainstore, and then the page is changed. If the bit is already set (to one) when a page must be changed, the page is just updated (without journaling or pinning it in mainstore). Other techniques are possible to distinguish between virgin pages and index pages that have been changed since the last sync point.

A list of all the database index pages that are currently pinned is updated to add an entry every time an index page is pinned (before it is updated in main storage). After unchanged and changed images of the associated data space entry are added to the journal and the journal is forced to be written to auxiliary storage, all the pages in the list are unpinned (which allows the pages to be written by the system storage management means to auxiliary storage), and all entries are removed from the list of pinned pages.

The journal sync point for a database index is updated occasionally, in order to limit the number of journal entries that must be used to recover after an abnormal termination. The more journal entries allowed between sync point updates for database indexes, the more journal entries that may need to be read from auxiliary storage and processed after an abnormal termination, and the longer recovery may take. A parameter is provided to allow the database user to control how frequently the sync points for database indexes are updated.

To recover database indexes and data spaces, the appropriate journal entries appearing after sync points for each object are applied to the indexes and data spaces. The sync points for indexes need not be the same as for data spaces. This is beneficial because it allows the system to avoid writing to auxiliary storage, at the same time, all the changed pages for database indexes and the data spaces they cover. The I/O operations required to write multiple objects to auxiliary storage could have severe performance impacts on the rest of the system. All objects in the set of database indexes and the data spaces they cover need not be synchronized (written to auxiliary storage) in unison in order to synchronize any one object.

To recover a data space or index, the entries on the journal (generated by transactions against the database being journaled) since the latest sync point for each object, are applied to the appropriate data space or index. The first step is to apply all journaled virgin images to the database index, to return the index to the consistent state that existed for the last sync point. The next step is to apply all journaled changes to the data space(s), and to record index changes that will be required to bring the database index(es) up to date. The final step is to apply the recorded changes to the index, which updates the index from its state at the last sync point to the state that corresponds with the last (newest) entry in the journal.

2.0 Detailed Description

The claims and disclosure herein provide for efficient recovery of a database by journaling zones of a page. A bit map of zones within each page is maintained so that the status of each zone can be tracked. Instead of tracking the changes at the logical page level as done in the prior art, the underlying machine index support in the operating system tracks a zone of the leaf page that could be much smaller than the page size. The same logging mechanisms and recovery mechanisms outlined in the patents cited above can be used except that zones would be managed instead of full page leaves. Tracking the smaller zones of the leaf pages makes the process more efficient both at run time and during recovery by reducing the period of time locks are held for memory deposits and reducing the amount of total data sent to disk for larger pages. By tracking at this more granular level (a sub-page) those applications which tend to have a scattered locality of reference pattern within the SQL index at index maintenance time would move substantially fewer bytes into the underlying journal. That would reduce both the run time burden and the size of the main memory footprint as well as speed up the recovery processing. The journal would flag these virgin image deposits as mere zones and replay those zones during a subsequent abnormal initial program load (IPL) by feeding the zone images back to the OS, who would overlay the matching zone on the disk with the virgin image harvested from the journal. The space and performance benefits would be most substantial for applications and indexes where the reference pattern tends to have little locality of reference (telephone number updates for example).

Referring to FIG. 1, a computer system 100 is one suitable implementation of a computer system that includes a journal mechanism to facilitate efficient processing and recovery of a database structure such as a database index. Computer system 100 is an IBM iSeries computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as direct access storage devices 155, to computer system 100. One specific type of direct access storage device 155a is a readable and writable CD-RW drive, which may store data to and read data from a CD-RW 195. Another type of direct access storage device 155b is a readable media such as a disk drive which stores a journal 156, data pages 157 and index pages 158 as described further below.

Main memory 120 preferably contains an operating system 121. Operating system 121 is a multitasking operating system known in the industry as i5/OS; however, those skilled in the art will appreciate that the spirit and scope of this disclosure is not limited to any one operating system. The memory includes a paging mechanism 122. The memory further includes a journal mechanism 123 that contains a page zone bit map 124, a pinned page list 125, a journal buffer 126 and a key mapping 127. The memory further contains data space pages 128 and index pages 129. Each of these entities in memory is described further below.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while operating system 121, paging mechanism 122, journal mechanism 123, page zone bit map 124, pinned page list 125, journal buffer 126, key mapping 127, data space pages 128 and index pages 129 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 121.

Although computer system 100 is shown to contain only a single processor and a single system bus, those skilled in the art will appreciate that a memory migration mechanism may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

At this point, it is important to note that while the description above is in the context of a fully functional computer system, those skilled in the art will appreciate that the journal mechanism described herein may be distributed as an article of manufacture in a variety of forms, and the claims extend to all suitable types of computer-readable media used to actually carry out the distribution, including recordable media such as floppy disks and CD-RW (e.g., 195 of FIG. 1).

Embodiments herein may also be delivered as part of a service engagement with a client corporation, nonprofit organization, government entity, internal organizational structure, or the like. These embodiments may include configuring a computer system to perform some or all of the methods described herein, and deploying software, hardware, and web services that implement some or all of the methods described herein.

Again referring to FIG. 1, the paging mechanism 122 in main memory 120 is a mechanism for storing pages of data in main memory. The pages of data for example may be 4 k byte pages of data which are paged in and out of volatile main memory 120 by the processor 110 which implements well known paging routines. The pages are stored on nonvolatile auxiliary storage units which are usually disk drive devices such as DASD 155b. The data residing in main memory 120 and on disk drives 155b comprises a plurality of databases, consisting of a combination of data spaces pages 128, 157, index pages 129, 158, journal buffer 126 and journal 156. The indexes provide different views of the data spaces. Data spaces and indexes are also both referred to as objects.

Figure 2:
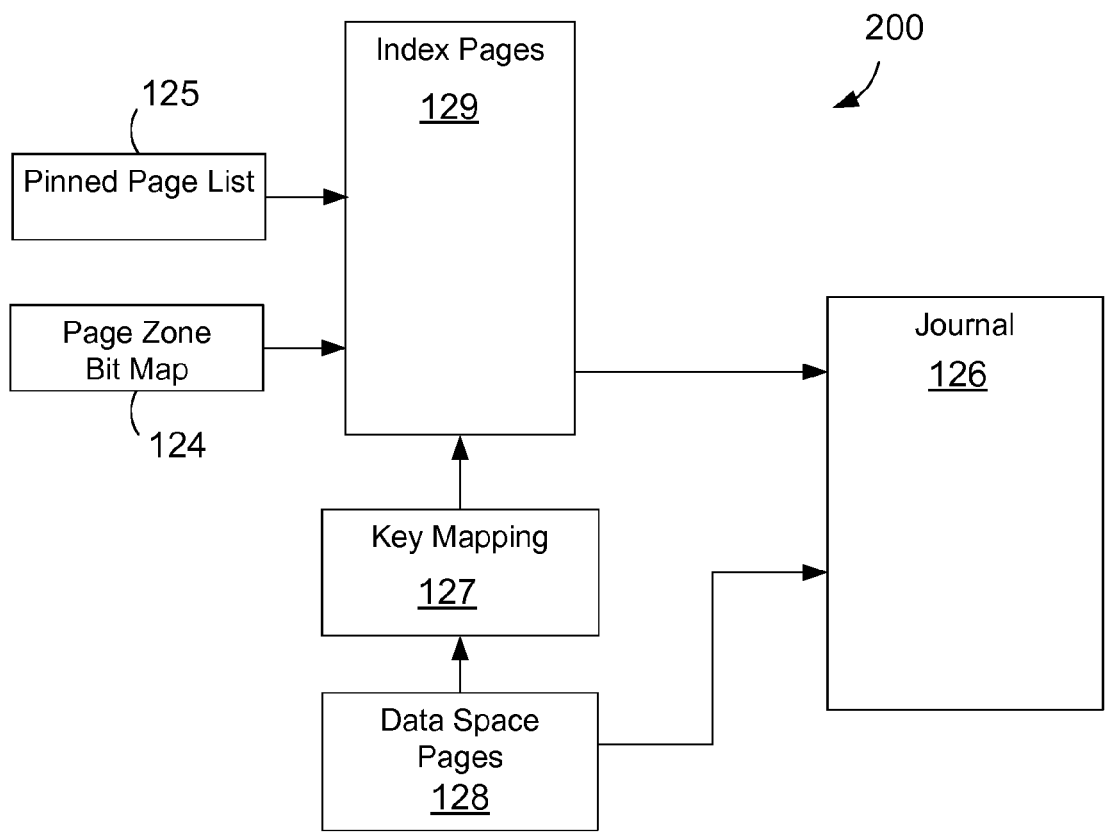
FIG. 2 is a more detailed block diagram of the journal mechanism in the computer system.

Referring now to FIG. 2, one specific implementation for the database index journal mechanism 123 in FIG. 1 is shown as 200. The journaling mechanism 200 comprises a portion of main memory 120 shown in FIG. 1 for journaling a recovery copy of pages of data. While the journal buffer 126, data space pages 128 and index pages 129 are shown pictorially in one block, portions of these blocks physically reside in multiple pages of main memory 120 and the remaining portions of these blocks are stored in non-volatile memory on DASD 155b. Unless otherwise noted, references to these blocks using the designations in FIG. 2 include the pages in both locations.

The index pages 129 contain keys relating to data on data space pages 128. The keys are typically organized in a binary radix tree. Further information on keys and binary radix trees is found in Howard and Borgendale, "System/38 Machine Indexing Support", IBM System/38 Technical Developments, 1978. (IBM Form G580-0237) Mapping between the data space pages 128 and the index pages 129 is provided by a key mapping block 127 which contains information necessary to transform data from a record in the data space 128 into a corresponding key in the index stored in index pages 129.

Copies of changes to be made to the data space pages 128 are buffered in a journal buffer 126. The journaled changes in the journal buffer 126 are written out to auxiliary storage (DASD 155b) prior to the changes being made on the data space pages. This is commonly known as a write-ahead journal.

Whenever a journaled data space is forced (forced to be written to auxiliary storage in its entirety), a sync point is marked on the journal for that data space. A sync point is a marker representing a point in time at which all previously altered pages of the journaled object have been written from volatile main storage to non-volatile auxiliary store.

Each time a new sync point is established the recovery processing mechanism can limit processing time by ignoring previous journaled deposits on behalf of the synchronized object. Consequently, this mechanism ensures that recent changes to the data space pages can be recovered in the event of system termination by merely employing the journaled images recorded subsequent to the sync point.

In addition to journaling the changes to the data space pages, a copy of index page zones to be changed is journaled prior to changing the index pages. Pages to be changed are identified as follows. Every index operation that changes an index (either an insert or remove) provides a key to be inserted or deleted. This key is used to search the index to find the point of change in the index. Thus after an initial search of the index, the page(s) which change in response to a data space change are located. Journaling the changes is accomplished by sending the page zone image to the journal if it is a virgin image.

The fact that an index page zone has been journaled is indicated in a page zone bit map 124 which contains a separate distinct bit position for each zone of an index page. If more changes are to be made to the zone of the index page before a sync point occurs for the index page, the corresponding bit position in the bit map 124 is examined. If the bit is on, the index changes are made without journaling the zone of the index page again. (See FIG. 3 and the corresponding description below.)

Changed index pages not already journaled since the last sync point are pinned and tracked in a pinned page list 125. The page is pinned before the virgin index page zone is sent to journal buffer 126. The presence of this pin prevents this page from being written out by normal virtual memory paging functions. After the page zone is sent to the journal buffer 126, the changes to the index pages are made.

The changes to the data spaces are reflected on the journal buffer 126 and are then written synchronously via a storage management function to auxiliary storage. In the illustrated example herein, the virgin index page zones are also written at the same time. They piggyback out to auxiliary storage with the changes to the data spaces. Thus, both varieties of journal deposits are bundled into a single packet of bytes, hence there is no extra I/O operation required to journal the index other than that required to journal the data space alone.

The pins on the now changed virgin index pages are pulled (the pinned page list 125 is used to identify these pages), via a request to storage management. This allows the altered index page images to again participate in normal paging activity. The pages are also removed from the pinned page list 125. The changes to the data spaces are also made following the synchronous write of the journal buffer. The above order ensures that any time the system crashes with loss of main storage content, the data spaces and indexes can be reconstructed purely from images resident on the journal.

Periodically objects being journaled are synchronized. A selection mechanism forces the object with the oldest (earliest) sync point to auxiliary storage every n journal entries, where n is a value selected to strike a balance between recovery time and performance overhead accompanying the sync point mechanism. It is referred to as a recovery constant.

Synchronization of the oldest object serves to limit the length of the recovery time by ensuring that during recovery (after a machine failure) the journal need not be processed further back than the final n entries residing on the journal. The recovery constant insures that no object has a sync point more than n entries from the end of the journal.

Figure 3:
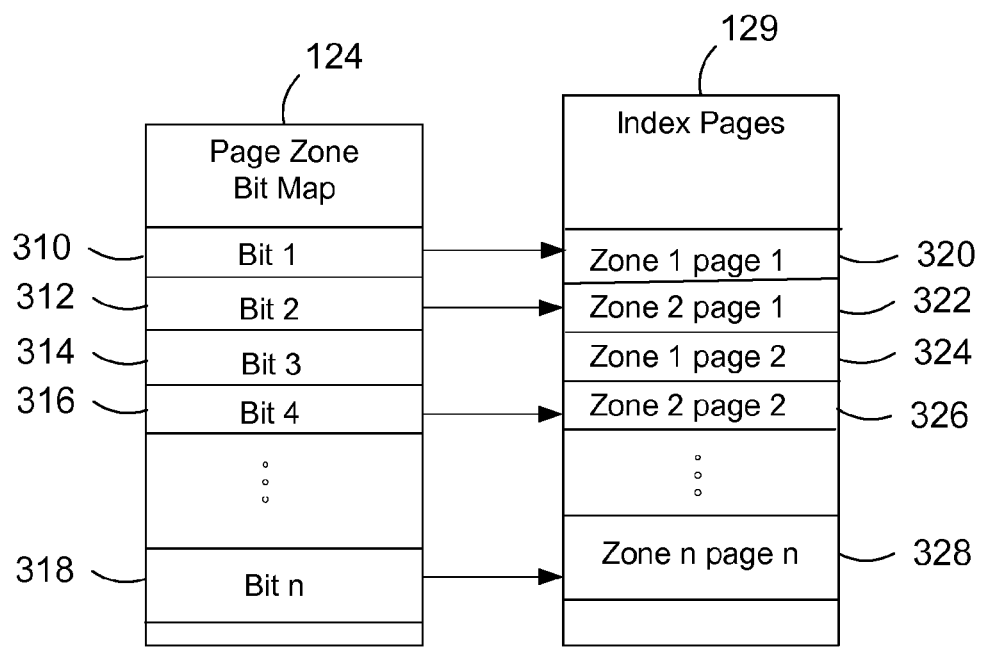
FIG. 3 is a block diagram of a page zone bit map.

FIG. 3 shows additional detail of a page zone bit map 124. The page zone bit map 124 has a bit for each zone of each page of the index pages 129. As shown in FIG. 3, bit 1 (at 310) corresponds to zone 1 page 1 (at 320), and bit 2 (at 312) corresponds to zone 2 page 1 (at 322). There may be other zones in page 1 that are not shown. Similarly, bit 3 (at 314) corresponds to zone 1 page 2 (at 324), an bit 4 (at 316) corresponds to zone 2 page 2 (at 326). There may be any number of pages with any number of zones such that bit n (at 318) corresponds to zone n, page n (at 328). The zone size compared to the index page size could be chosen to optimize different aspects of the performance resulting in different possible numbers of zones per index page size. Again, the remaining bits are not shown for simplicity.

Since what had formerly been treated as a single logical page (at least 4 k and often as big as 512 k apiece) is now going to be viewed as broken into zones, there are going to be times when a new key comes along and finds that lots of the zones within the surrounding logical page are completely empty. In this case, if the new keys land in such an empty zone, it makes sense from an efficiency point of view to avoid capturing a virgin image of that empty zone. Doing so, further helps achieve the overall objective of minimizing the quantity of bytes which are moved into the journal and ultimately written to disk. Blindly capturing the "before"/virgin image of each zone without regard to the zone's status would wastefully store these empty zones. This would be wasteful by slowing down both run time and IPL/recovery time as well a bloating the journal along the way. Thus, those zones whose virgin states have not yet been journaled/captured are preferably journaled the first time they are modified, because the "virgin" image of the zone is available. In our examples below, the journal mechanism would wait to journal those zones with virgin states until the first time they are modified. The fact that the zone bit isn't yet turned on signifies that the virgin state of this particular zone has not yet been captured. Periodically, set zones get "aged" and reset by the sync-point process, where after "n" journal entries have arrived, the oldest entries are removed when the main memory resident "after" images of the zone are written to disk. Thus the matching bit for the zone may be zeroed or cleared for zones written to disk while establishing the new sync-point.

Figure 4:
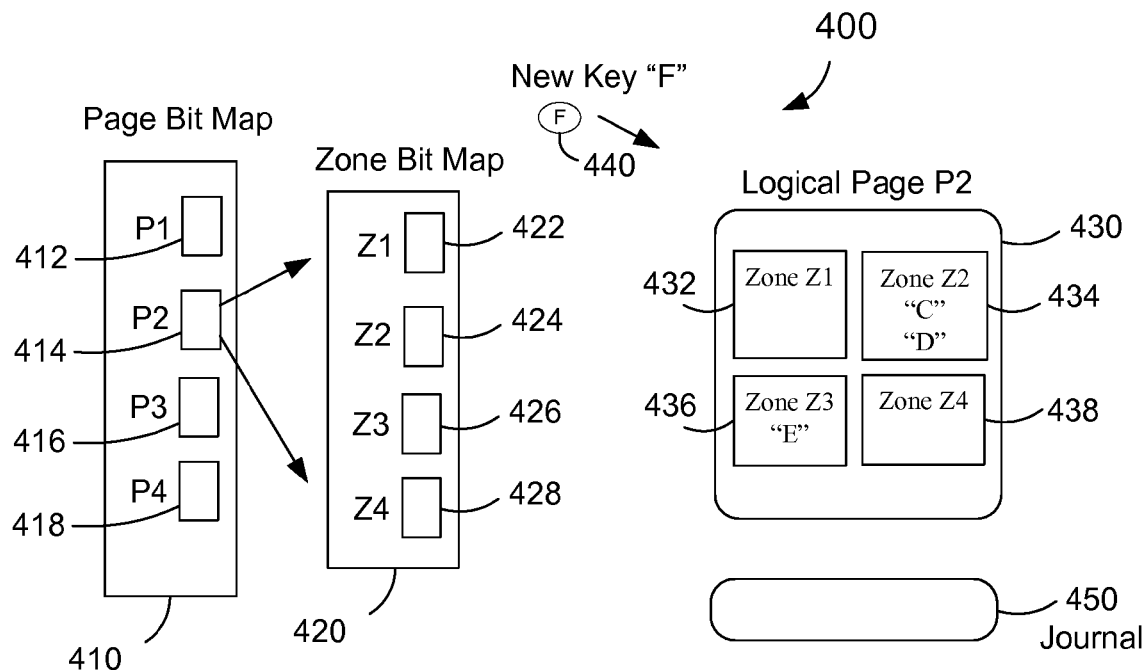
FIGS. 4 and 5 illustrate an example of implementing a page zone bit map.
Figure 5:
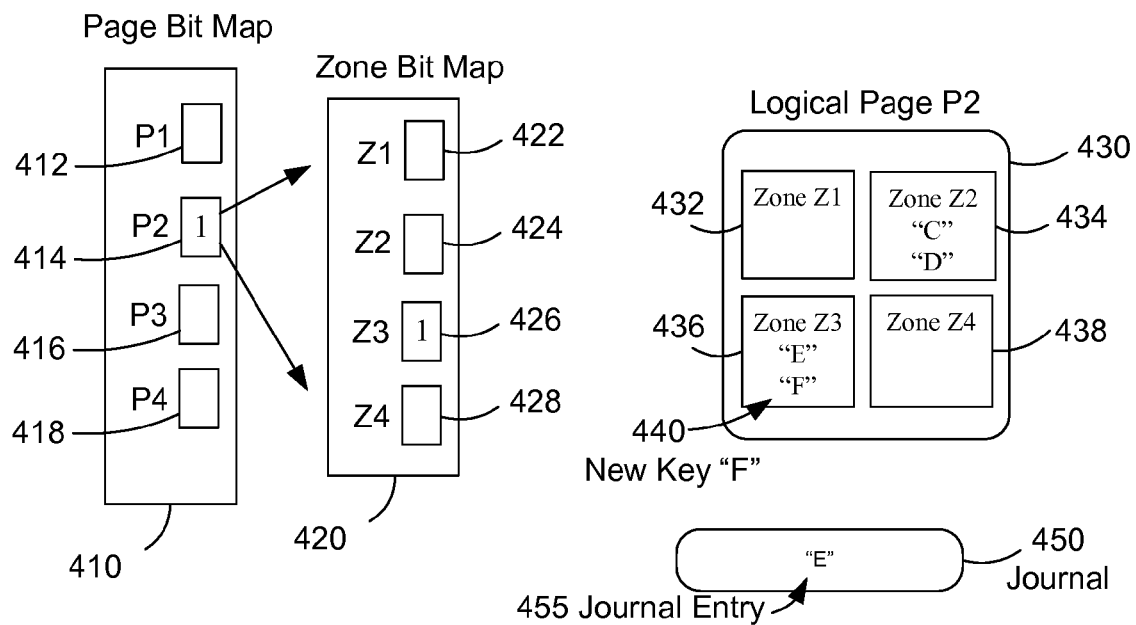

FIGS. 4 and 5 illustrate an example of journaling a logical page with a plurality of zones as described herein. In this example there is a page zone bit map that has bits for each page, and zone bit map. Alternatively, there could be a single page zone bit map as described above in FIG. 3. FIG. 4 represents portions of an index 400. Index 400 includes a logical page bit map 410 with a bit for each page (412, 414, 416, 418), a logical zone bit map 420 housing a bit for each zone (422, 424, 426, 428), and four logical pages (P1, P2, P3, P4) each 16 k in size (only page P2 430 is shown). Index 400 further includes a journal buffer 450 for holding journal entries that indicate populated portions of logical pages before the image of the page is updated. Logical page P1 is the trunk page and pages P2, P3, P4 are leaf pages. Each of the logical pages is subdivided into zones with each zone 4 k in size. Hence page P2 430 consists of zones Z1 432, Z2 434, Z3 436, and Z4 438. In our example, pre-existing key values C and D and E already reside in logical page P2 of the index. Key values C and D reside in Zone Z2 434 while key value E resides in Zone Z3 436. For this example, a new row is to be added to the data space such that the new row houses key value: "F". The new key value "F" when added to the index will reside on Page P2 430 in Zone Z3 436.

FIG. 5 illustrates the index 400 in FIG. 4 after adding the new key value "F" 440. The new key value is added to the logical page as follows. First, the index is navigated until the leaf level page destined to house the new key is identified. In this case the leaf page P2 430 is identified. The corresponding bit for logical page P2 414 is then set as shown to indicate page P2 has one or more zones that have bits set. Next, the logical page is pinned in a pinned page list to indicate that the new image of the page should not be allowed to reach the disk until the matching journal entries that are about to be produced have reached the disk. The zone(s) within the page which will be modified as a result of storing the new key ("F") within this logical page are identified. In our example, zone Z3 436 of logical page P2 430 is identified. If the matching zone bit(s) are not already set, then the corresponding zone bits are set to indicate which zones have had their unchanged image journaled before being changed since a last sync point update. In our example zone bit Z3 426 is turned on or set. Next, a copy of the populated portion of the affected zone is extracted. In this example, the key value "E" residing within Z3 436 is extracted. Then a matching new journal entry "E" 455 representing the virgin before image of the populated portion of the affected zone is constructed with the extracted copy and placed in the journal buffer 450 as shown. The new key value, "F" is then copied into the affected zone(s), which in this example is zone Z3 436.

Figure 6:
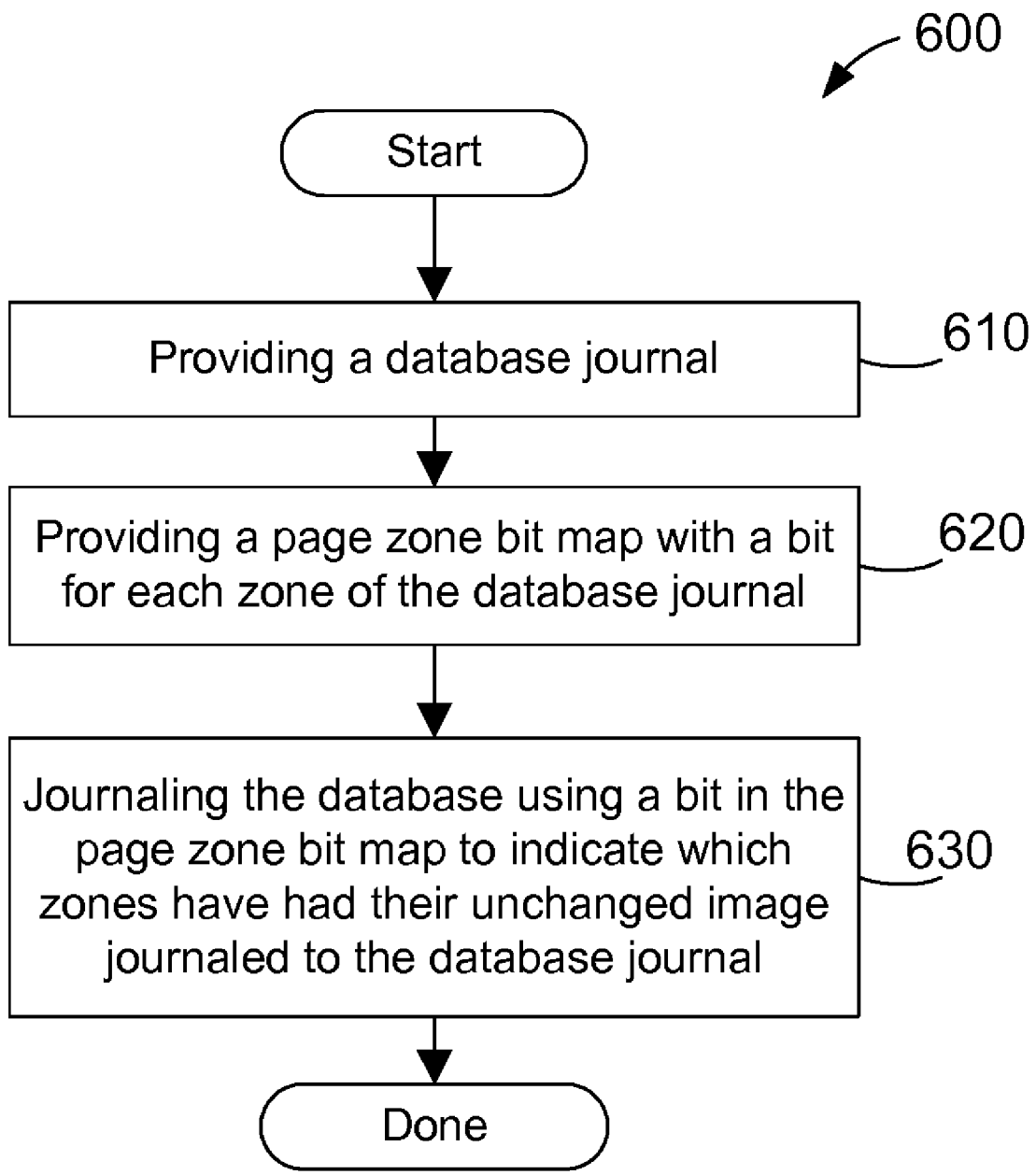
FIG. 6 is a method flow diagram for using a page zone bit map.

FIG. 6 shows a method 600 for journaling zones of a leaf page for a database index. The steps in method 600 are preferably performed by the journal mechanism 123 in combination with the paging mechanism 122 shown in FIG. 1. First, provide a database journal (step 610). Next, provide a page zone bit map with a bit for each zone within each page of the database index (step 620). Then, journaling the database index using a bit in the page zone bit map to indicate which zones have had their unchanged image journaled to the database journal (step 630). The method 600 is then done.

Figure 7:
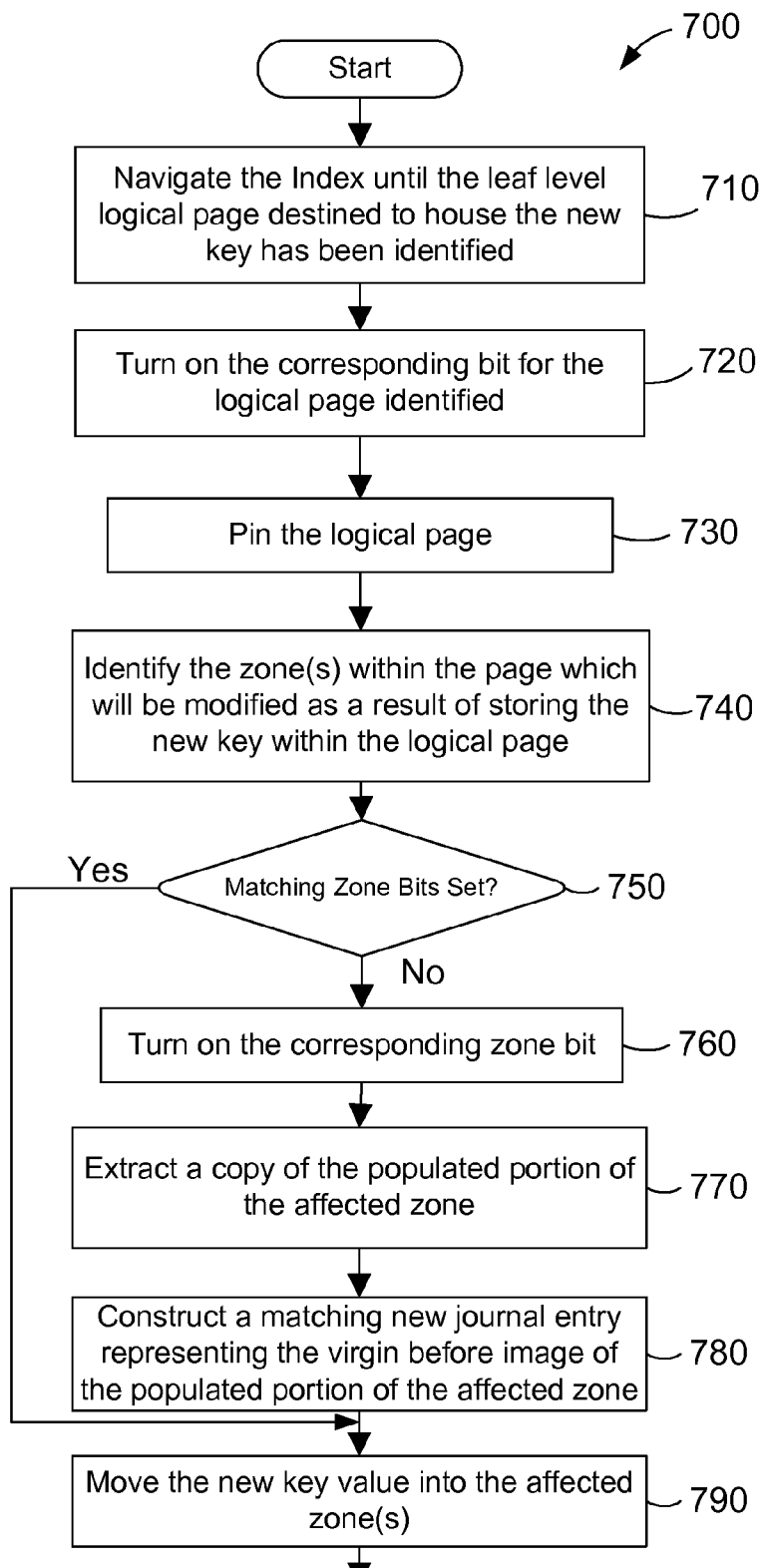
FIG. 7 is another method flow diagram for using a page zone bit map.

FIG. 7 shows another method 700 for journaling zones of a leaf page for a database index. The steps in method 700 are preferably performed by the journal mechanism 123 in combination with the paging mechanism 122 shown in FIG. 1. First, navigate the index until the leaf level page destined to house the new key to place in the index has been identified (step 710). Then, turn on the corresponding bit for the logical page identified (step 720). Pin the logical page (step 730). Next, identify the zone(s) within the page which will be modified as a result of storing the new key within this logical page (step 740). If the matching zone bit(s) is not already on (step 750=no), then turn on the corresponding zone bit (step 760), extract a copy of the populated portion of the affected zone (step 770) and construct a matching new journal entry representing the virgin before image of the populated portion of the affected zone (step 780). Then move the new key value ("F" in our example) into the affected zone(s) (step 790). If the matching zone bit(s) is already on (step 750=yes), then go to step 790. The method 700 is then done.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer-implemented method for journaling zones of a leaf page for a database index, the method comprising the steps of:
   (A) navigating the database index until a logical page to house a new key has been identified;
   (B) identifying affected zone(s) within the page which will be modified as a result of storing the new key within this logical page;
   (C) setting a corresponding zone bit in a zone bit map if it is not already set, where the zone bit map has a bit for each zone of the logical page;
   (D) setting a corresponding bit for the logical page identified in a page bit map;
   (E) pinning the logical page identified;
   (F) extracting a copy of a populated portion of the affected zone and construct a matching new journal entry representing a before image of the populated portion of the affected zone; and
   (G) moving a key value for the key into the affected zone(s).

2. The method of claim 1 further comprising the step of using the bit corresponding to the page zone to indicate that a bit in the zone bit map is set, and using the bit in the zone bit map to indicate which zones have had their unchanged image journaled before being changed since a last sync point update.

3. The method of claim 1 further comprising the step of waiting to journal those zones with virgin states until the first time they are modified.

4. An article of manufacture comprising: a page journaling mechanism stored on a computer recordable media that when executed by a computer processor performs the steps of:
   (A) navigating the database index until a logical page to house a new key has been identified;
   (B) identifying affected zone(s) within the page which will be modified as a result of storing the new key within this logical page; and
   (C) setting a corresponding zone bit in a zone bit map if it is not already set, where the zone bit map has a bit for each zone of the logical page;
   (D) setting a corresponding bit for the logical page identified in a page bit map;
   (E) pinning the logical page identified;
   (F) extracting a copy of a populated portion of the affected zone and construct a matching new journal entry representing a before image of the populated portion of the affected zone; and
   (G) moving a value for the new key into the affected zone(s).

5. The article of manufacture of claim 4 further comprising the steps of:
   using the bit corresponding to the page zone to indicate that a bit in the zone bit map is set, and
   using the bit in the zone bit map to indicate which zones have had their unchanged image journaled before being changed since a last sync point update.

6. The article of manufacture of claim 4 further comprising the step of waiting to journal those zones with virgin states until the first time they are modified.

* * * * *